US010128725B2

(12) United States Patent
Stroberg et al.

(10) Patent No.: US 10,128,725 B2
(45) Date of Patent: Nov. 13, 2018

(54) CONTACT BRUSH HOLDER

(75) Inventors: Stefan Stroberg, Taby (SE); Erik Bjorklund, Motala (SE)

(73) Assignee: AB Dynamoborstfabriken, Vadstena (SE)

( * ) Notice: Subject to any disclaimer, the term of this patent is extended or adjusted under 35 U.S.C. 154(b) by 197 days.

(21) Appl. No.: 14/237,442

(22) PCT Filed: Jun. 15, 2012

(86) PCT No.: PCT/SE2012/050660
§ 371 (c)(1),
(2), (4) Date: Feb. 6, 2014

(87) PCT Pub. No.: WO2013/025153
PCT Pub. Date: Feb. 21, 2013

(65) Prior Publication Data
US 2014/0246945 A1     Sep. 4, 2014

Related U.S. Application Data

(60) Provisional application No. 61/523,904, filed on Aug. 16, 2011.

(30) Foreign Application Priority Data

Aug. 16, 2011 (SE) ...................... 1150744

(51) Int. Cl.
*H01R 39/38* (2006.01)
*H01R 39/40* (2006.01)
(Continued)

(52) U.S. Cl.
CPC ............. *H02K 13/003* (2013.01); *F03D 9/25* (2016.05); *H01R 39/381* (2013.01); *H02K 5/148* (2013.01); *H01R 39/40* (2013.01)

(58) Field of Classification Search
CPC ....... F03D 9/002; H01R 39/381; H01R 39/40; H02K 13/003; H02K 5/148
(Continued)

(56) References Cited

U.S. PATENT DOCUMENTS 1,835,513 A * 12/1931 Munday ................. H01R 43/14
29/28
2,295,289 A * 9/1942 Nardone ................... F02N 5/04
123/179.22
(Continued)

FOREIGN PATENT DOCUMENTS

AT      134787    *  9/1933
CH      251511    * 10/1947
(Continued)

OTHER PUBLICATIONS

English translation of FR 864549; Apr. 1941; France.*
(Continued)

*Primary Examiner* — Bernard Rojas
*Assistant Examiner* — Ahmed Elnakib
(74) *Attorney, Agent, or Firm* — Olive Law Group, PLLC

(57) ABSTRACT

A contact brush holder is disclosed. According to an aspect, a brush holder is provided for receiving at least two contact brushes and holding the brushes in contact with a slip ring in an electrical power device. The brush holder comprises a holder body adapted for receiving said brushes. The brushes are arranged on opposite sides of a plane in which a central axis of the brush holder is located and in which an axis of rotation of the electric apparatus is situated. A biasing device is provided for biasing the holder body towards the slip ring, thus biasing the at least two contact brushes towards the slip ring.

10 Claims, 6 Drawing Sheets

(51) Int. Cl.
*H02K 5/14* (2006.01)
*H02K 13/00* (2006.01)
*F03D 9/25* (2016.01)

(58) Field of Classification Search
USPC .................. 310/147–148, 239–248, 232
See application file for complete search history.

(56) References Cited

U.S. PATENT DOCUMENTS

| | | | | |
|---|---|---|---|---|
| 2,471,480 | A | | 5/1949 | Culkosky |
| 2,520,379 | A | * | 8/1950 | Ward .................... H01R 39/27 310/246 |
| 2,614,421 | A | * | 10/1952 | Culkosky ................ G01N 3/00 310/247 |
| 2,804,558 | A | | 8/1957 | Bauroth |
| 3,311,768 | A | * | 3/1967 | Mowry ................ H01R 39/381 310/246 |
| 3,327,147 | A | * | 6/1967 | Shobert, II ............ H01R 39/38 310/242 |
| 4,082,975 | A | | 4/1978 | Azarov et al. |
| 4,567,414 | A | | 1/1986 | Berings |
| 6,278,197 | B1 | * | 8/2001 | Appa ..................... F03D 1/025 290/54 |
| 2011/0115331 | A1 | | 5/2011 | Yu et al. |

FOREIGN PATENT DOCUMENTS

| | | |
|---|---|---|
| CN | 2563793 Y | 9/2002 |
| DE | 898470 C | 11/1953 |
| DE | 4027958 A1 | 3/1992 |
| EP | 0099158 | 1/1984 |
| EP | 0099158 A1 | 1/1984 |
| EP | 0474146 A1 | 3/1992 |
| FR | 864 549 A | 4/1941 |
| FR | 864549 A | 4/1941 |
| GB | 313 267 A | 6/1929 |
| GB | 313267 | 6/1929 |
| GB | 1 125 131 A | 8/1968 |
| GB | 1125131 | 8/1968 |
| WO | 2013025153 A1 | 2/2013 |

OTHER PUBLICATIONS

English translation of EP 0474146; Mar. 1998; Germany; Kipke Winfried.*
English translation of DE 898470; Scwalm Julius; Nov. 1953; Germany.*
English translation for DE4027958; Winfried Kipke; Germany.*
Int'l. Preliminary Report on Patentability dated Feb. 27, 2014 for corresponding patent application PCT/SE2012/050660; references previously cited on Feb. 6, 2014.
Examination Report from the Intellectual Property Office of New Zealand for corresponding New Zealand patent application, Patent Application Title: "Contact Brush Holder," IP No. 621435, dated Dec. 11, 2014.
Patent Examination Report No. 1, Australian Patent Office, dated Dec. 22, 2015.
Int'l. Search Report dated Nov. 9, 2012 for corresponding patent application PCT/SE2012/050660.
Int'l-type Search Report dated Feb. 15, 2012 for corresponding patent application SE-1150744-9.
European Patent Office; Extended European Search Report regarding PCT/SE2012050660, dated Mar. 17, 2015.
European Communication (search report) pursuant to Article 94(3) EPC for European Patent Application No. 12 824 144.9-1801, dated Mar. 2, 2016.
Further Examination Report for New Zealand IP No. 621435, dated Mar. 7, 2016.
Examination Report in corresponding Chinese patent application dated Jul. 20, 2015.
Further Examination Report in corresponding New Zealand Patent Application 621435.
SIPO Chinese Office Action No. 201280038807.3 dated Sep. 30, 2016.
European Patent Office; Extended European Search Report regarding Application No. 12824444.9 dated Jun. 19, 2017.
European Office Action issued in counterpart EP Application No. 12824444.9 dated Feb. 28, 2018.

* cited by examiner

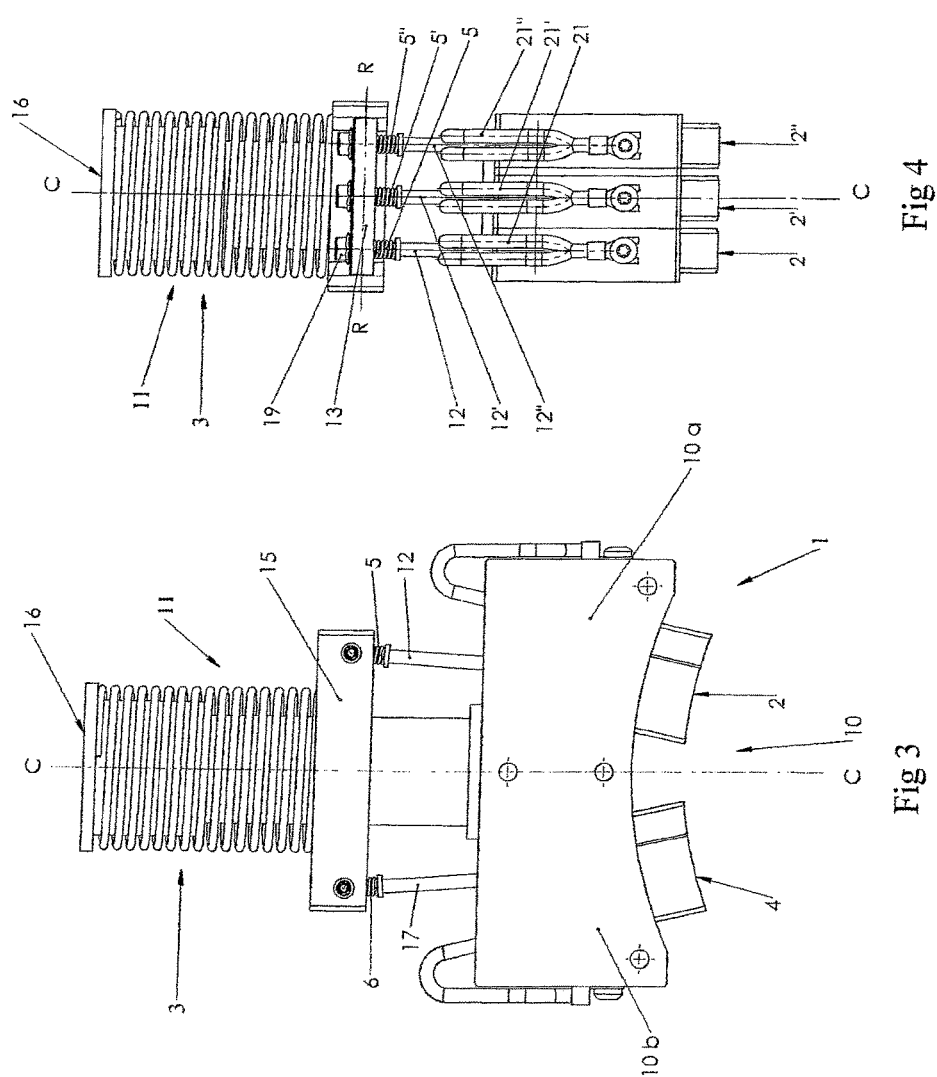

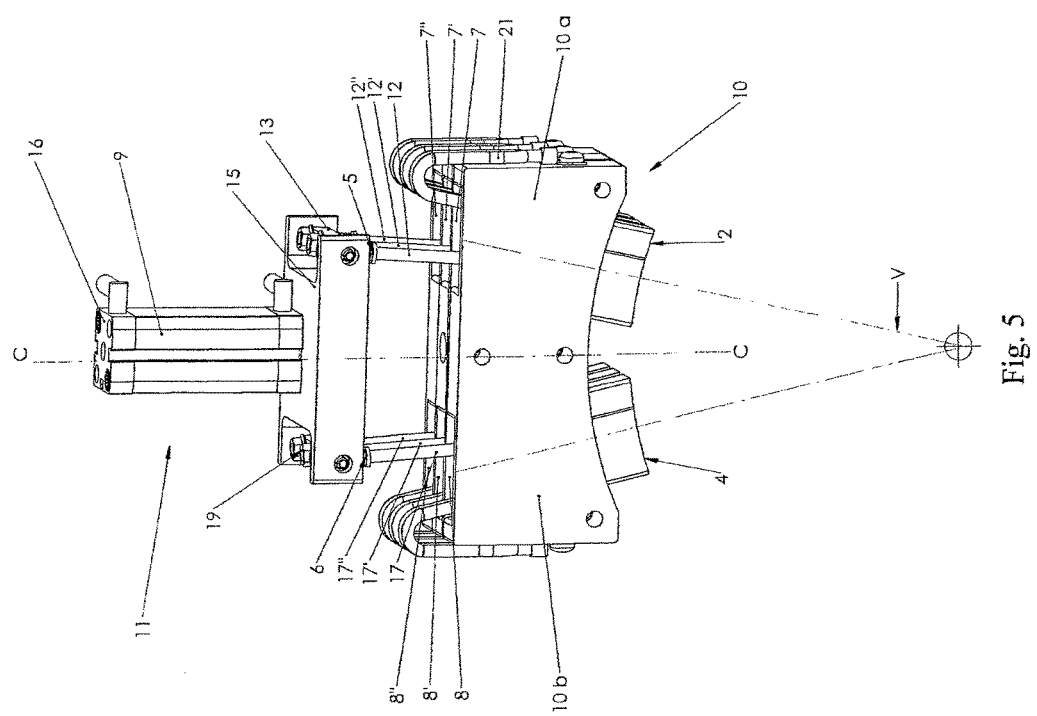

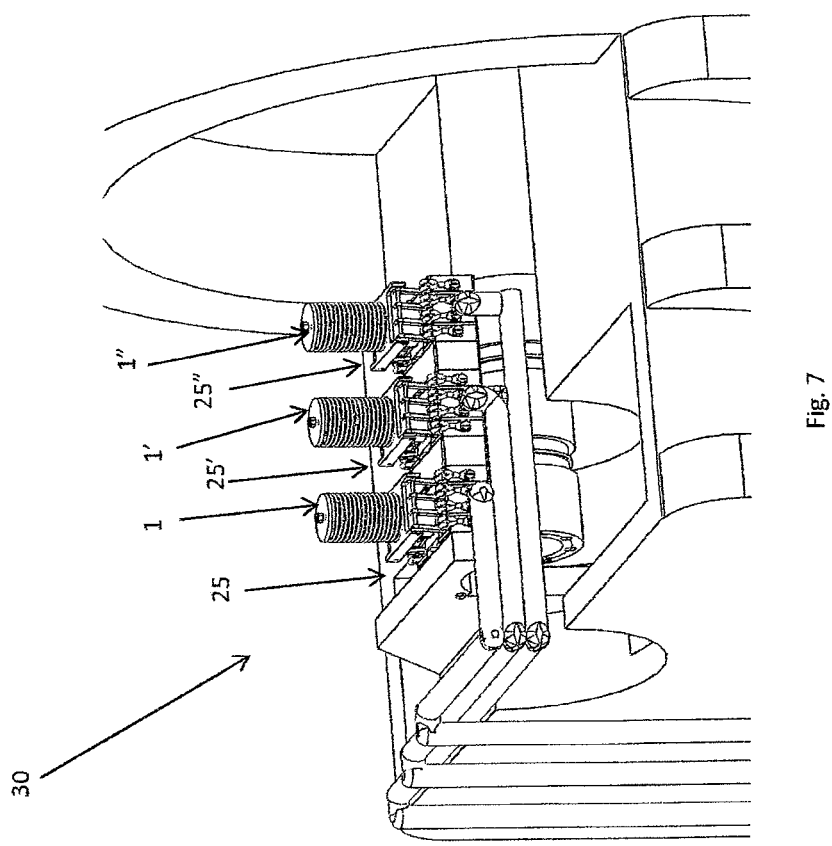

CONTACT BRUSH HOLDER

CROSS REFERENCE TO RELATED APPLICATIONS

This application is a 35 USC 371 application of International PCT Patent Application No. PCT/SE2012/050660, filed on Jun. 15, 2012, which claims priority to U.S. Provisional Patent Application Ser. No. 61/523,904 filed Aug. 16, 2011, and Swedish Patent Application No. 1150744-9 filed Aug. 16, 2011; all of the contents of which are hereby incorporated by reference herein in their entireties.

TECHNICAL FIELD

The present document relates to a brush holder for multiple contact brushes, such as carbon contact brushes.

More particularly, the present disclosure relates to a V shaped brush holder for holding two or more brushes in parallel.

BACKGROUND

Contact brushes are commonly used in connection with collectors or slip rings which are rotary electrical contacts used in for example many different types of electric motors or electrical generators.

The contact brush is placed in a so called brush holder in which a spring is typically used to maintain a contact pressure towards the slip ring. The spring steadily pushes the brush downwards towards the slip ring as the brush wears down. The holder thus provides for a stable support of the contact brush in a proper position in relation to the collector or slip ring and provides means for applying contact force on the brush.

An assembly of several brush holders may be mounted in parallel across the surface of a collector or slip ring. These brush holders usually have individual clamps and tension adjustments for each brush.

One such basic brush holder is disclosed in U.S. Pat. No. 2,804,558, wherein two brushes may be mounted in parallel and where so called hammers are arranged to provide for applying pressure to hold the brushes in contact with the collector or slip ring. Each of the hammers is provided with means for providing a tensioning action on the hammer exerting a constant pressure on the brush. These means may comprise a flat spring or any other type of elastic member.

Different diameters of slip rings make contact with the collector in different ways, and at different angles and the holder may thus be designed to provide the proper contact angle for the brush.

It is important that the pressure on the different brushes is constant such that the brushes wear evenly.

Today, slip ring arrangements are commonly used in wind power plant units, which are often placed at remote locations for instance at sea. There is therefore an increased need for a brush holder that can accommodate several brushes mounted in parallel, and which does not require as much maintenance in terms of keeping an even pressure on the brushes in order to provide an optimal contact between the brush and slip ring.

SUMMARY

It is an object of the present disclosure, to provide an improved or alternative brush holder, which eliminates or alleviates at least some of the disadvantages of the prior art.

The invention is defined by the appended independent claims. Embodiments are set forth in the appended dependent claims and in the following description and drawings.

According to a first aspect, there is provided a brush holder for receiving at least two contact brushes and holding said brushes in contact with a slip ring in an electrical power device. The brush holder comprises a holder body adapted for receiving said brushes, said brushes being arranged on opposite sides of a plane in which a central axis of the brush holder is located and in which an axis of rotation of the electric apparatus is situated. The biasing device for biasing the holder body towards the slip ring, thus biasing the at least two contact brushes towards the slip ring. An individual compensation means for each contact brush is provided between at least one of said brushes and the biasing device.

An electric power device may be any type of electric power using brushes contacting a slip ring, such as an electric motor and/or a generator.

A brush may be a bundle of substantially flexible bristles of electrically conducting material, or a substantially rigid body of electrically conducting material such a carbon brush comprising silver or copper.

The biasing device may comprise a spring, such as a helical spring, a blade spring or a gas spring. In the alternative, or as a complement, the biasing device may comprise a force transferring element, such as a hydraulic cylinder or the like, which, in turn, may be connected to a spring element, e.g. a source of compressed gas.

By this arrangement it is possible to provide all brushes arranged in the holder with the same mechanical contact pressure at all times. This means that the brushes will be worn evenly. The pressure is thus distributed to the brushes in parallel and there is therefore no need for an individual pressure providing or biasing arrangement for each brush.

This arrangement is further advantageous in that the voltage drop between the contacting material, i.e. the slip ring, and the contact brush remains relatively constant and that the current thereby is distributed more evenly. If one brush for some reason is worn faster than the others is will lose its pressure against the contacting material surface and the pressure on the other brushes in the holder will increase, until all brushes are worn evenly again.

Since all brushes work in parallel the wear on each brush is therefore equal for each brush in contrast to other solutions available today the equipment does not need to be repaired or maintained if one brush is worn out before the others. This is of course is a great advantage when the arrangement is placed in, e.g. a wind power equipment which may be remotely located.

As the contact brushes are made from a material which is not completely uniform, the contact brushes will wear down unevenly. The provision of individual compensation means for each contact brush allows for the effect of this uneven wear to be diminished, since the compensation means allow for an optimization of the force applied, or an optimization of the pressure distribution, by minimizing vibrations, on the brushes. Thus, if a contact brush has been worn down less than the others, a greater force will be applied on this brush than on the other brushes. The individual compensation means further allows for an optimized pressure to be applied on each of the brushes, i.e. the force applied to the brushes may be completely individual. This allows for a considerably improved operation period or working life of the brushes.

According to a second aspect there is provided a brush holder for receiving at least two contact brushes and holding said brushes in contact with a slip ring in an electrical power device, the brush holder comprising a holder body adapted for receiving said brushes. The brushes are arranged on opposite sides of a plane in which a central axis of the brush holder is located and in which an axis of rotation of the electric apparatus is situated. A biasing device for biasing the holder body towards the slip ring, thus biasing the at least two contact brushes towards the slip ring.

The biasing device may be operable between the holder body and a mounting part.

According to the second aspect compensation means may be provided between at least one of said brushes and the holder body.

The biasing device may be arranged to provide a biasing force along a substantially radial direction of the slip ring.

According to the first and second aspect a first and second portion of the holder body may be arranged at angle to a plane in which the central axis of the holder body is located.

This means that the pockets arranged to receive the brushes may be arranged at an angle to the central axis, i.e. may be arranged to tangent the centre of the slip ring in order to provide for an optimal engagement surface for the brush against the slip ring.

By "arranged at angle" means that the holder body forms an "V" with the first and second portions of the holder body and thus the brushes arranged along the legs of the "V". This type of V-shaped holder, with the biasing device that provides a pressure to all brushes arranged in the holder simultaneously, may provide for a very stable and convenient holder for those applications where it is crucial to have an even pressure of the brushes towards the slip ring, or where it is inconvenient to change the brushes often, such as in remotely located electrical power units or in units that are used frequently, and where regular maintenance breaks needs to be avoided.

The brushes may be arranged substantially symmetrically arranged about a plane, in which the radial direction is located, and in which a rotation axis of the slip ring is located.

The biasing device may engage each brush respectively through a pressure finger arrangement.

According to one embodiment of the first and second aspect each pressure finger arrangement may be provided with compensation means.

By this arrangement is possible to even further provide each brush with an even pressure. The compensation means may comprise springs adapted to minimize vibrations, thus having a larger spring constant than the main spring or biasing device. Due to the density of the brush material vibrations, i.e. small differences in pressure or tension of the carbon brushes towards the slip ring, will naturally occur and the compensation means may provide for a way to regulate these differences or vibrations. The compensation means may also act a shock absorber that absorbs vibrations and irregularities present in the slip ring or collector.

The pressure finger arrangement may be arranged to be pivotable about an axis of rotation.

By arranging the force fingers to be pivotable it may be possible to even further compensate for any pressure losses that may occur when the holder body is arranged at an angle to the central axis or is in a V shape. The ability to pivot thus means that also the pressure finger arrangement may be arranged at an appropriate angle, in relation to a plane in which the central axis of the holder lies, in order to provide for an optimal contact pressure.

The combination of the force finger arrangement being arranged at an angle and being provided with compensation means may also provide for an increased flexibility of the brush holder in relation to the slip ring as it may provide for a possibility of having different diameters of the slip ring and different sizes of the brushes.

The holder body may be a substantially rigid body having means for holding at least two brushes. These means may be pockets adapted to hold the brushes.

The biasing device may further comprise a pressure plate.

By the provision of one pressure or force plate in common for all the brushes, one brush cannot be worn further than the other brushes, regardless of their dimensions, which makes deformation of the slip ring virtually impossible. Further cables etc are prevented from physically damaging the slip ring.

According to a third aspect there is provided a brush unit comprising a brush holder according to the first and second aspect and at least two brushes.

According to a fourth aspect there is provided an electric power device comprising a brush unit according to the third aspect and a slip ring, whereby the biasing device of the brush unit is arranged to bias the at least two brushes against the slip ring.

According to a fifth aspect there is provided a method of biasing a contact brush towards a slip ring in an electric power device. The method comprises providing a brush holder body holding at least two contact brushes, and biasing the brush holder towards the slip ring, such that the at least two contact brushes are biased towards the slip ring.

Through this method there is provided a way of biasing or pushing the all brushes arranged in the holder towards the slip ring simultaneously. This means that there is no need for individual pressure arrangements for each brush, which is advantageous in that the brushes will be worn evenly. The pressure is this distributed to the brushes in parallel and there is thus no need for an individual pressure or biasing arrangement for each brush. This method is further advantageous in that the voltage drop between the contacting material, i.e. the slip ring, and the contact brush remains relatively constant and that the current thereby is distributed more evenly. If one brush for some reason is worn faster than the others is will lose its pressure against the contacting material surface and the pressure on the other brushes in the holder will increase, until all brushes are worn evenly again.

The method according to the fifth aspect may comprises providing individual compensation means for each contact brush between at least one of said brushes and the biasing device, for optimizing the pressure distribution from the biasing device.

Individual compensation means may be provided to optimize the small pressure differences caused by irregularities in the contact brush material. The compensation means thus minimizes vibrations and thus even further optimize the pressure distribution from the biasing device According to a sixth aspect there is provided a wind power unit comprising a brush holder according to the first and second aspect and a slip ring.

BRIEF DESCRIPTION OF THE DRAWINGS

Embodiments of the present solution will now be described, by way of example, with reference to the accompanying schematic drawings.

FIG. 3 is a schematic side view of a brush holder according to the present disclosure.

FIG. 4 is a schematic front view of a brush holder according to the present disclosure.

FIG. 5 is a schematic perspective view of a brush holder according to one embodiment of the present disclosure.

FIG. 7 is a schematic view of generator provided with brush holders according to one embodiment of the present disclosure.

DESCRIPTION OF EMBODIMENTS

In the below description the term brush should be interpreted as a contact or electrical carbon brush.

Figure 1:
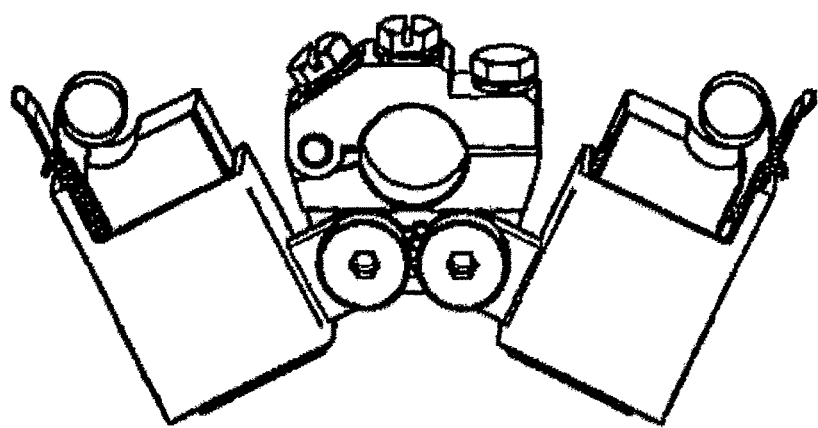
FIG. 1 is a schematic perspective view of a brush holder according to prior art.

FIG. 1 illustrates a brush holder according to prior art. Each contact brush is provided with an individual biasing means to maintain the pressure of the brush towards the slip ring.

Figure 2:
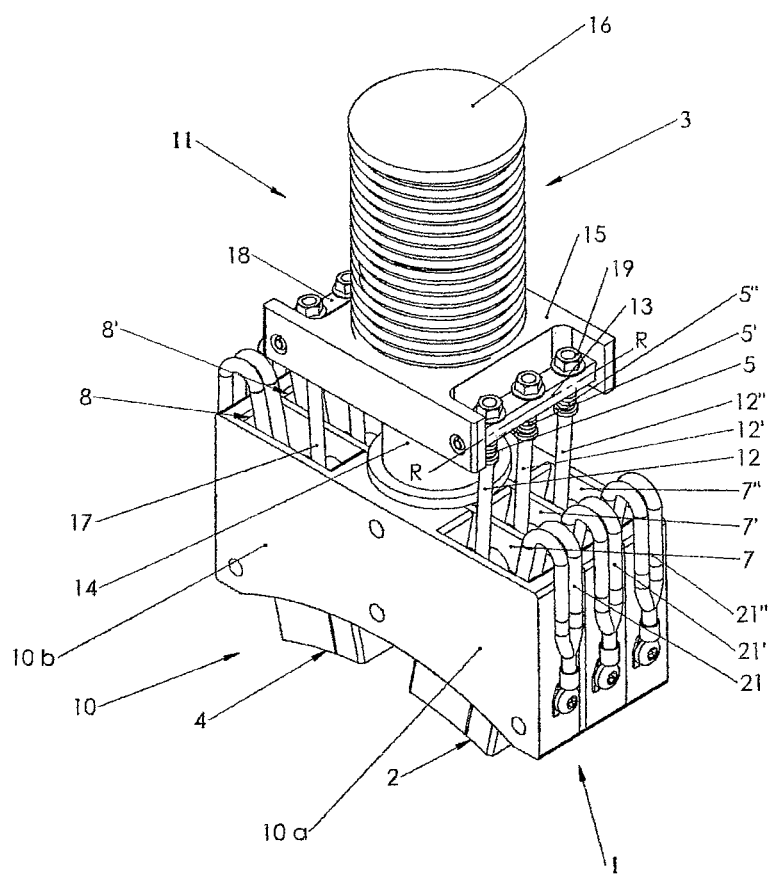
FIG. 2 is a schematic perspective view of a brush holder according to the present disclosure.

FIG. 2 illustrates a brush holder 1 according to the present disclosure. The brush holder 1 is provided with a holder body 10 which is adapted to receive and hold electrical contact brushes, the holder body 10 and/or any brushes arranged therein may be connected to or engage a biasing device 11. The holder body 10 may be provided with pockets, 7, 8, adapted for receiving and holding one, two, three, or more electrical contact brushes 2,4. The brushes 2,4, as arranged in the pockets 7,8, may be connected to a force or pressure plate 15. The pressure plate 15 may be connected to or be a part of the biasing device 11.

The biasing device 11 may comprise a spring 3, such as a socket spring arrangement 14 which is shown in FIGS. 2-4 or according to an alternative embodiment a pneumatic or hydraulic cylinder 9, which is shown in FIG. 5. The spring or biasing device may be any type of spring arrangement, such as a helical or blade spring. The main function of the spring or biasing device os to provide an even contact pressure or tension towards or against the slip ring during the entire cycle of use and wear.

The brushes may be so called carbon brushes which are well known in the art. Any types of electrical contact brushes may be arranged in the holder, such as silver or cupper graphite brushes, and they may be of any conventional type such as carbon brushes, strip or laminate, strip and wire or folded mesh or gauze brushes.

Figure 6:
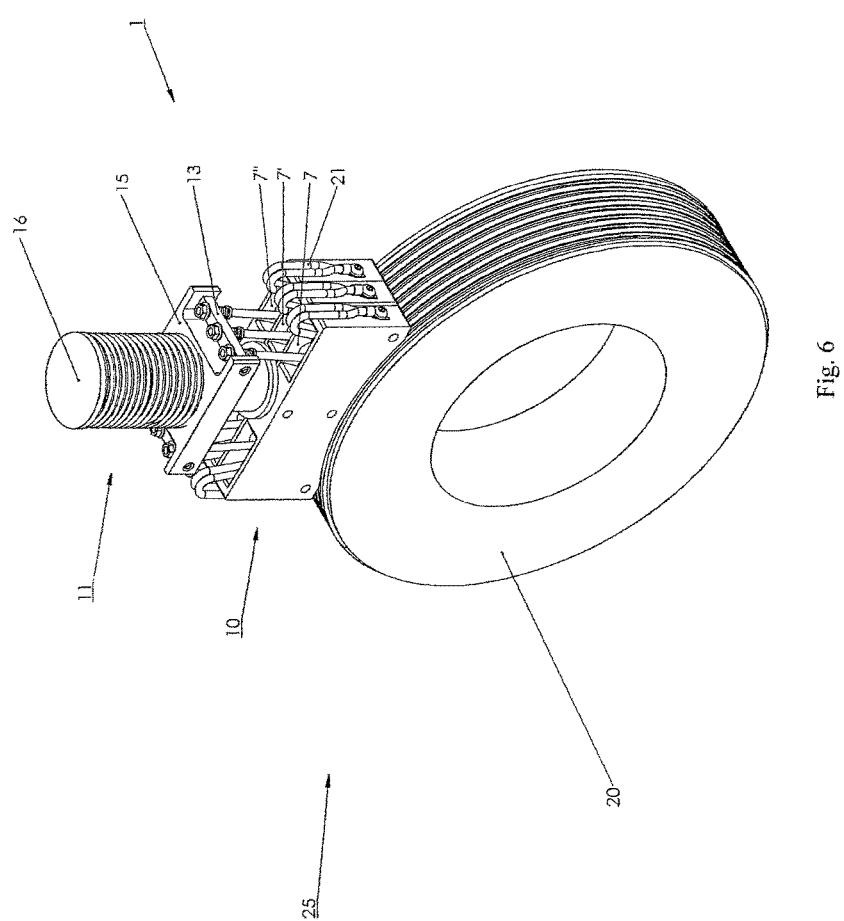
FIG. 6 is a schematic perspective view of a system with a brush holder and a slip ring.

As shown in FIGS. 2-5 there is only one biasing device 11, thus forming a main spring arrangement, arranged to provide the required pressure to all the brushes 2, 2', 2", 4 arranged in the holder body 10 simultaneously, such that the brushes may engage or contact a slip ring 20 (as shown in FIG. 6) properly.

The holder 1 may be arranged in the holder body 10, such that the brushes 2, 4 may contact a slip ring 20 at the end of the brushes which is distal to the biasing device 11 (as shown in FIG. 6).

In one embodiment, the force or pressure plate 15 may be arranged at one end of the spring arrangement 3, which is closest to the holder body 10. According to an alternative embodiment, the force plate may be arranged at the opposite end, i.e. at the end or mounting portion 16 of the spring that is distal to the holder body.

According to one embodiment, the brushes 2, 4 are arranged around a central axis C-C, i.e. arranged om opposite sides of a plane in which a central axis C of the brush holder 1 is located as shown in FIGS. 2 and 3. According to this embodiment the holder body 10 may comprise a first 10a and a second 10b portion as seen in a plane parallel to the central axis C-C.

According to one embodiment the brushes may be arranged evenly or symmetrically around the central axis. This means that the holder body 10 and its pockets 7, 8 are arranged such that if the holder is to retain four brushes these are arranged such that the first and second brushes 2, 2' are placed on one side or in the first portion 10a, and the third and fourth brushes 4, 4' are placed opposite to the first and second brushes or in the second portion 10b. Further, as shown in FIGS. 2-5, if the holder is adapted to retain six brushes the first three 2, 2', 2" are placed on one side of the central axis and the last three 4, are placed on the opposite side.

According to an alternative embodiment the number of brushes arranged on each side of the axis of rotation or central axis C-C is an uneven number. However the total surface area of the brushes that engages the slip ring is equal or "symmetrical" on both sides. That means that for example two brushes having a surface area of 4 cm$^2$ may be arranged on one side (or in the first portion 10a of the holder body) of the central axis and one brush having a surface area of 8 cm$^2$ may be arranged on the opposite side (or in the second portion 10b of the holder body).

Other types of arrangements of the brushes are also conceivable, but are not shown in the figures.

The holder body 10 and/or the pockets 7, 8 may be sized and adapted to accommodate brushes of different sizes and shapes. The holder body 10 may further be adapted or constructed to retain virtually any number of brushes, but is preferably adapted to retain between 2 and 16 brushes.

According to a preferred embodiment the holder is adapted to retain between 2 and 8 brushes arranged evenly and symmetrically around the central axis C-C.

FIG. 4 illustrates one embodiment in which the brushes 2,4 may be connected to the force or pressure plate 15 through so called force or pressure fingers 12, 17, i.e. one pressure finger 12, 12', 12", 17, 17', 17" is arranged to engage each brush 2, 2', 2", 4, (4', 4' not shown in the figures) being arranged in the pockets 7, 7', 7", 8, 8' 8". The pressure finger may according to one embodiment be arranged to push down on the brush without being fixedly connected to the brush (not shown). According to an alternative embodiment the pressure finger is fixedly or hingedly connected to the brush and/or the brush holder body or pocket.

The force or pressure plate 15 may, according to one embodiment, be connected to the biasing device 11 such that the biasing device is able to act on all the brushes arranged in the holder body simultaneously. This means that instead of having a biasing device 11 for each brush as shown in the prior art holder of FIG. 1, there is instead one common or main biasing device that provides the required pressure for all the brushes arranged in the holder 1.

According to one embodiment, the holder body 10 may be arranged such that the first 10a and second 10b portions of the holder body the or pockets 7, 8, are arranged at an angle, which may be <90 degrees, to a plane in which the central axis C-C lies. This means that the brushes may be arranged at an angle to the central axis C-C of the holder. As shown in FIG. 5 the brush holder thus forms a V shape, where the brushes are arranged along the legs of the V and where the legs of the V crosses such that an imaginary bottom end of the V may be aligned with the centre of or axis of rotation of a slip ring (not shown in the figure), and thus the carbon brushes may be arranged to tangent the centre of the slip ring. This also means that the first 10a and second 10b portions of the holder body may be arranged to allow for the brushes 2,4 thus to contact or engage the slip ring at two different locations. The diameter of the slip ring determines the optimal angle.

According to an alternative embodiment the angle of the V shape may be adapted for different types of brushes, and the angle may be such that the legs of the "V" cross and thus imaginary bottom end of the "V" may be arranged at any other locations than the centre of the slip ring.

According to one embodiment the pressure fingers 12 may be arranged to engage a tilting device 13, which device 13 may be arranged in connection with the pressure plate 15. According this embodiment the tilting device 13 may be connected to the pressure plate such that it is pivotable, i.e. able to pivot, about an axis of rotation R-R. By this arrangement it is possible to arrange the pressure finger arrangement at an angle in relation to the central axis of the holder. This may be done to further be able compensate for any pressure losses that may occur when the holder body is arranged at an angle to the central axis, i.e. is in a V shape. The rotation or tilting of the pressure finger arrangement 12 may thus be adjusted to correspond to or be adjustable to the angle at which the first 10a and second 10b portions of the holder body are arranged. This means that when the biasing device 11 is operated to push the carbon brushes towards the surface of the slip ring the pressure fingers are able to tilt or pivot about the axis of rotation R-R at a degree that is optimal to provide for the proper compensation for pressure losses. The changes in spring force when the biasing device 11 when it changes during the operation distance, can be calculated through the spring constant. This may therefore be compensated by the force finger being able to tilt or pivot about the axis of rotation R-R in relation to the brush, such that a contant and even pressure may be applied to the brushes towards the slip ring. Through this arrangement also the decreasing weight of the brush, due to the wear, can be compensated for, depending on the location of the brush in relation to the centre of the slip ring. According to yet an alternative each pressure finger is arranged to be able to pivot independently of the other pressure fingers (not shown).

According to an alternative embodiment the pressure fingers my be fixedly connected to the pressure plate, thus having a constant angle in relation to the central axis C-C.

The connection of the pressure fingers 12 to the tilting device 13 may be accomplished with conventional means such as a nut and bolt arrangement 19. The pressure fingers may according to alternative embodiment be welded to the tilting device 13 and/or pressure plate 15 or be connected or fixated by any other suitable means.

Each pressure finger 12, 12', 12" may be provided with individual compensation means 5, 5', 5" in order to minimize vibrations and thus even further optimize the pressure distribution from the biasing device 11. The compensation means 5 may according to one embodiment be arranged at the side of the tilting device 13 which is closest to the holder body 10, shown in FIG. 4, and may thus be arranged between the brush and the holder body. The compensation means 5 may also be arranged, which can been seen in FIG. 4, between the biasing device 11 (or the tilting device 13) and the contact brush 2. The compensation means 5, 6 may be a spring having a higher spring force or spring pressure than the biasing device 11 or main spring. This means that the sum of forces that the compensation means exert on each contact brush is higher than the force exerted by the single biasing device or main spring. For example, if the biasing device exert a force of 10 N, the sum of the force exerted by the compensation means, i.e. the total force exerted by the compensation means is greater than 10 N.

According to one alternative embodiment the compensation means may be tension spring arranged on the side of the tilting device which is distal to the holder body 10 (not shown).

According to yet an alternative the pressure finger arrangement 12 may be arranged to constitute the compensation means e.g. by being a spring blade, a leaf blade or a laminated type spring (not shown).

FIGS. 2-4 illustrate that the biasing device 11 may comprise a spring arrangement 3 such as a socket spring 14. This arrangement may be provided with a mounting part 16 at the end of the spring arrangement that is distal to the holder body. The mounting part 16 may also provide for a connection to a control system or for the connection to an electrical system in which the holder is arranged.

The biasing device 11 may be operable, or moveable between the holder body 10 and the mounting part 16 and substantially in a direction along the central axis C-C of the holder 1. The biasing device 11 may be arranged to provide a biasing force along a substantially radial direction of the slip ring which means that the biasing device may be arranged to push the brushes towards the slip ring simultaneously. This means that an external pressure source is arranged to influence the biasing device 11, which then pushes the brushes towards the slip ring with a pressure suitable to provide an optimal contact between the slip ring or connector and the carbon or contact brushes. By biasing device is thus meant a contact pressure providing arrangement.

FIG. 5 illustrates a holder 1 in which the biasing device 11 comprises a pneumatic or hydraulic cylinder 9. By such an arrangement, the pressure provided may be even further optimized and controlled.

FIG. 6 illustrates a system 25 with a brush holder 1, holding six brushes adapted to be able to engage a slip ring 20. As shown in FIG. 6 the brush holder is arranged in a V shape, such that the receiving portions tangent the centre of the slip ring for an optimal contact surface of the contact brushes against the slip ring 20.

In order to provide for an optimal or maximal flexibility in the system the angle of the first 10a and second 10b portions or pockets 7,8 in relation to the slip ring and the size of the bushes is important. The combination of the force finger arrangement 12, 17 being able to pivot about an axis of rotation combined with the compensation means 5, 6 may thus provide for the possibility of having different diameters of the slip ring 20 and different sizes of the brushes 2,4 and may thus provide for a desired flexibility and ability of the system to compensate for differences in pressure or tension of the brushes towards the slip ring, that may occur due to the density of the brushes, the design of the slip ring and other, both internal and external, influences.

The present holder may further provide for an advantage in that the cables 21, 21', 21" connecting the brushes 2, 4 to the brush holder body 10 may be prevented from falling onto the slip ring arrangement in that the holder 1 may be arranged at a 90 degree angle, i.e. perpendicular, to the arrangement shown in FIG. 6. This type of arrangement of the holder is further advantageous in that it may no longer be necessary to take the weight of carbon brushes and thus its effect on the spring force into account.

FIG. 7 illustrates brush holders 1, 1', 1" and slip ring systems 25, 25', 25" arranged in parallel in a generator 30. The generator 30 may be any conventional type of generation placed in a wind power plant, a ship or any other type of electrical power unit that requires a rotary electrical connection.

According to one embodiment the pressure to the biasing device may be provided from an external source such as a compressor or a fixedly mounted spring arrangement.

The holder may according to one embodiment, not shown in the figures, be provided with equipment for measuring temperature of the brushes and equipment for measuring the wear of the brushes, measurements that can be transmitted to a computer or some type of warning system. This is especially advantageous when the holder is incorporated into a system which cannot easily be regularly manually checked, such a remotely located wind power plant.

The holder may be machined or moulded and it may be made from a composite or metal material.

The holder may be adapted to different sizes and needs depending on the material of the brush, the diameter of the slip ring and the requested transmission of energy.

The invention claimed is:

1. A brush holder for receiving at least two contact brushes and holding said brushes in contact with a slip ring in an electrical power device, the brush holder comprising:
   a holder body adapted for receiving and retaining said brushes, said brushes being arranged on opposite sides of a plane in which a central axis of the brush holder is located, said brushes are substantially arranged and retained, evenly and symmetrically, on each side of the holder body, around the circumference of the slip ring;
   a first and second portion of the holder body, wherein the first and second portion are arranged at an angle to a plane in which the central axis of the holder body is located;
   a single main biasing device for biasing said brushes and for providing an even contact pressure, via a pressure plate, using a pressure finger arrangement on said brushes towards the slip ring, thus biasing said brushes towards the slip ring simultaneously;
   a tilting device arranged in connection to the pressure plate such that the tilting device pivots about an axis of rotation that is parallel to the axis of rotation of the slip ring, wherein the pressure finger arrangement is arranged to engage the tilting device; and
   an individual compensation component for each contact brush being provided at an angle relative to the center axis of rotation of the electric apparatus and between at least one of said brushes and the single main biasing device,
   wherein said compensation component comprises a spring having a higher spring force than the single main biasing device, the spring being arranged on the side of the tilting device which is distal to the holder body,
   wherein the single main biasing device engages each brush simultaneously and pivots at an axis that is orthogonal to the center axis of the electric apparatus and extends in a substantially radial direction of the slip ring.

2. The brush holder according to claim 1, wherein the single main biasing device is moveable between the holder body and a mounting part.

3. The brush holder according to claim 1, wherein the single main biasing device is arranged to provide a biasing force along a substantially radial direction of the slip ring.

4. The brush holder according to claim 1, wherein the brushes are substantially symmetrically arranged about the plane, in which the radial direction is located, and in which the rotation axis of the slip ring is located.

5. The brush holder according to claim 1, wherein said pressure finger arrangement is provided with said compensation components.

6. The brush holder according to claim 1, wherein the holder body is a substantially rigid body having pockets for holding at least two brushes.

7. A brush unit comprising a brush holder according to claim 1 and at least two brushes.

8. An electric power device comprising the brush unit as claimed in claim 7; the tilting device according to claim 1, and the slip ring according to claim 1, whereby the single main biasing device of the brush unit is arranged to provide an even contact pressure, via the pressure plate according to claim 1, using the pressure finger arrangement, according to claim 1, on the at least two brushes against the slip ring simultaneously, and
   wherein compensation component are provided between at least one of said brushes and the holder body, and wherein said compensation component comprises a spring having a higher spring force than the single main biasing device, and wherein the tilting device is connected to the pressure plate such that the tilting device pivots about an axis of rotation that is parallel to the axis of rotation of the slip ring, wherein the pressure finger arrangement is arranged to engage the tilting device.

9. A wind power unit comprising a brush holder according to claim 1 and the slip ring.

10. A method of biasing a contact brush towards a slip ring in an electric power device, comprising:
   providing a brush holder body holding at least two contact brushes, the at least two contact brushes being arranged on opposite sides of a plane in which a central axis of the brush holder is located, wherein said at least two contact brushes are substantially arranged and retained evenly and symmetrically, on each side of the holder body, around the circumference of the slip ring;
   providing a first and second portion of the holder body, wherein the first and second portion are arranged at an angle to a plane in which the central axis of the brush holder body is located;
   providing a single main biasing device for providing an even contact pressure, via a pressure plate, using a pressure finger arrangement on the at least two contact brushes against the slip ring;
   providing a tilting device arranged in connection to the pressure plate such that the tilting device pivots about an axis of rotation that is parallel to the axis of rotation of the slip ring, wherein the pressure finger arrangement is arranged to engage the tilting device;
   biasing, using the single main biasing device, the at least two contact brushes towards the slip ring, such that the at least two contact brushes are biased towards the slip ring simultaneously; and
   providing individual compensation component for each of the contact brushes and the holder body, arranged between the at least two contact brushes and the single main biasing device,
   wherein said individual compensation component comprise a spring having a higher spring force than the single main biasing device, the spring being arranged on the side of the tilting device which is distal to the holder body,
   wherein the single main biasing device engages each brush simultaneously and pivots at an axis that is orthogonal to the center axis of the electric apparatus and extends in a substantially radial direction of the slip ring.

* * * * *